US008522010B2

(12) United States Patent  
Ozzie et al.

(10) Patent No.: US 8,522,010 B2
(45) Date of Patent: Aug. 27, 2013

(54) PROVIDING REMOTE USER AUTHENTICATION

(75) Inventors: Raymond E. Ozzie, Seattle, WA (US); Jack E. Ozzie, North Bend, WA (US); Thomas A. Galvin, Amherst, NH (US); Eric M. Patey, Rockport, MA (US)

(73) Assignee: Microsoft Corporation, Redmond, WA (US)

( * ) Notice: Subject to any disclaimer, the term of this patent is extended or adjusted under 35 U.S.C. 154(b) by 471 days.

(21) Appl. No.: 12/254,115

(22) Filed: Oct. 20, 2008

(65) Prior Publication Data

US 2010/0100725 A1   Apr. 22, 2010

(51) Int. Cl.
   *H04L 29/06*   (2006.01)
   *G06F 7/04*    (2006.01)
   *G06F 15/16*   (2006.01)
   *G06F 17/30*   (2006.01)

(52) U.S. Cl.
   USPC .................. 713/155; 726/4; 726/5; 726/8

(58) Field of Classification Search
   None
   See application file for complete search history.

(56) References Cited

U.S. PATENT DOCUMENTS

| | | | |
|---|---|---|---|
| 6,934,858 B2 | 8/2005 | Woodhill | |
| 6,993,658 B1 | 1/2006 | Engberg et al. | |
| 8,151,328 B1* | 4/2012 | Lundy et al. | ...................... 726/5 |
| 2003/0154406 A1 | 8/2003 | Honarvar et al. | |
| 2005/0097320 A1 | 5/2005 | Golan et al. | |
| 2006/0204051 A1 | 9/2006 | Holland, IV | |
| 2006/0206709 A1 | 9/2006 | Labrou et al. | |
| 2006/0259438 A1 | 11/2006 | Randle et al. | |
| 2007/0011099 A1 | 1/2007 | Sheehan | |
| 2007/0016941 A1 | 1/2007 | Gonzalez et al. | |
| 2007/0022196 A1 | 1/2007 | Agrawal | |
| 2007/0022301 A1* | 1/2007 | Nicholson et al. | ............ 713/184 |
| 2007/0107050 A1 | 5/2007 | Selvarajan | |
| 2007/0125840 A1 | 6/2007 | Law et al. | |
| 2007/0136573 A1* | 6/2007 | Steinberg | ...................... 713/155 |
| 2007/0174630 A1 | 7/2007 | Shannon et al. | |
| 2007/0175978 A1 | 8/2007 | Stambaugh | |
| 2007/0198435 A1 | 8/2007 | Siegal et al. | |
| 2007/0203850 A1* | 8/2007 | Singh et al. | ...................... 705/67 |

(Continued)

FOREIGN PATENT DOCUMENTS

WO        2008053279 A1       5/2008

OTHER PUBLICATIONS

Search Report cited in related PCT Int. Application No. PCT/US2009/061199 dated May 17, 2010.
U.S. Appl. No. 12/254,119, filed Oct. 20, 2008, Ozzie et al.

(Continued)

*Primary Examiner* — Shin-Hon Chen
(74) *Attorney, Agent, or Firm* — Microsoft Corporation

(57) ABSTRACT

Providing a remote computer user authentication service involves providing a reference to a user authentication service in a host server's source code (e.g., website source code). Further, integration code that may be used in an application programming interface (API) on the host server for interaction with a user authentication service can be provided. Additionally, a user interface (UI) for user authentication on the host server, and an authentication-test message on the host server using the UI may be provided. Also, providing authentication can comprise sending an authentication-request message to a mobile device designated by the user; and/or can comprise the user responding with information from the authentication-test message. The host server can be notified of the user's authentication after a correct response is received by the user authentication service.

20 Claims, 9 Drawing Sheets

(56) References Cited

U.S. PATENT DOCUMENTS

| | | | |
|---|---|---|---|
| 2008/0005228 A1 | 1/2008 | Subbian | |
| 2008/0250477 A1* | 10/2008 | Samuelsson et al. | 726/4 |
| 2009/0047928 A1* | 2/2009 | Utsch et al. | 455/410 |
| 2009/0235346 A1* | 9/2009 | Steinberg | 726/8 |
| 2010/0100725 A1 | 4/2010 | Ozzie et al. | |
| 2010/0100945 A1 | 4/2010 | Ozzie et al. | |
| 2010/0146259 A1 | 6/2010 | Tatham | |

OTHER PUBLICATIONS

"Authentify", Retrieved at <<http://www.authentify.com/>>, Sep. 25, 2008, p. 1.

"Entrust", Retrieved at <<http://www.entrust.com/strong-authentication/user-authentication/methods.htm>>, Sep. 25, 2008, pp. 4.

Hofmann, Gerhard "Remote Access Solution with Mobile Phone / SMS-based Authentication?", Retrieved at <<http://www.securegear.com/comp.security.misc/1/remote-access-solution-with-mobile-phone-SMS-based-authent-article4980-.htm>>, Dec. 19, 2008, pp. 4.

"PortWise", Retrieved at <<http://www.portwise.com/>>, Sep. 25, 2008, p. 1.

"UbiSecQ: An Innovative Security Solution Provider in Asia", Retrieved at <<http://www.free-press-release.com/news/200411/1100882632.html>>, Nov. 19, 2004, pp. 3.

"2-Factor Authentication—What is MobileKey?", Retrieved at <<http://www.visualtron.com/products_mobilekey.htm>>, Sep. 25, 2008, pp. 3.

"Clavister SMS one-time Password Service", Retrieved at <<http://www.clavister.com/pdf/clavister-dts-sms_service.pdf>>, pp. 1-2.

"VeriSign Mobile Banking", Retrieved at <<http://www.verisign.com/static/040910.pdf>>, pp. 1-2.

"Xecure Message Service", Retrieved at <<http://www.mynetsec.com/book/export/html/200>>, Sep. 12, 2008, pp. 1-15.

Notice of Allowance cited in U.S. Appl. No. 12/254,119 dated Nov. 28, 2011.

Non-Final Office Action cited in related U.S. Appl. No. 12/254,119 dated Apr. 19, 2011.

Response to Non-Final Office Action, U.S. Appl. No. 12/254,119 dated Aug. 18, 2011.

Int. Preliminary Report on Patentability cited in related PCT Application No. PCT/US2009/061199 dated Apr. 26, 2011.

"Mobile Key", Retrieved at <<http://www.visualtron.com/products_mobilekey.htm>>, Sep. 12, 2008, pp. 1-3.

"Phone-Based Two-Factor Authentication Now Available for OpenID", Retrieved at <<http://www.reuters.com/article/pressRelease/idUS151722+12-May-2008+BW20080512>>, May 12, 2008, pp. 1-3.

"Xecure Message Service", Retrieved at <<http://www.mynetsec.com/book/export/html/200>>, Sep. 12, 2008.

EP Search Report cited in EP Application No. 09822510.5 dated Apr. 12, 2012, 9 pgs.

EP Communication cited in EP Application No. 09822510.5 dated May 2, 2012, 1 pg.

Reply EP Communication cited in EP Application No. 09822510.5 dated Nov. 8, 2012, 29 pg.

"VeriSign Mobile Banking", Data Sheet, Mar. 11, 2008, Reprinted from the Internet at: http://www.verisign.com/static/040910.pdf, 2 pgs.

"Clavister SMS One-Time Password Service" Service Data Sheet, Apr. 1, 2008, reprinted from the Internet at: http://fips.agencedig.com/media/brochures_clavister/clavister-dts-sms-service-gb.pdf, 2 pgs.

\* cited by examiner

PROVIDING REMOTE USER AUTHENTICATION

BACKGROUND

In a computing environment, websites and enterprise servers often utilize user authentication for security purposes, for example, to access server or website content or to perform online transactions. User authentication typically requires that a user register their identification information with the website or server, often supplying a unique user name and an associated security code, for example, a text-based password. User authentication that utilizes a user name and associated password is typically referred to as one-factor authentication. Occasionally, websites/server systems may request that a user provide more than one form of authentication (e.g., a security key), which is often referred to as a strong authentication (e.g., two-factor authentication). Further, websites/servers can utilize authentication codes in order to determine whether the user is a human or an Internet-bot (e.g., a computer used to spam a website).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Often, when a user of a website or an enterprise server system wishes to access certain information or perform certain transactions on the website/server they are asked to enter a user name and password into a user interface (UI). Using a password associated with a particular username can provide for authentication of the user, for example, because the password is typically known only to the user who is registered with the website/server. However, security for remote access to websites and servers can be compromised if passwords are used by those other than the registered user (e.g., by identity thieves). Two-factor authentication can be used to add another layer of security to user authentication, for example, when a user performs an online purchase.

Current multi-factor authentication techniques include utilizing telephones or mobile devices as a second authentication factor. As an example, when a website user attempts to purchase an item online, the host website can send a send a short message service (SMS) message (e.g. a text message) to the user's mobile device (e.g., mobile phone). In this example, after receiving the SMS message, the user can reply with an authentication key provided by the website. In this way, for example, an identity thief would need the user's username, password, and designated mobile device in order to complete the authentication.

Previous and current solutions include a system that automatically calls a user designated telephone upon receiving an authentication request from a server system (Authentify, http://www.authentify.com). However, only those third-party sites that have a previous business arrangement and a specific license with the authentication service may utilize this type of multi-factor authentication for their users. Further, this system does not provide broad-based auto-provisioning of site, nor does it allow end user (e.g., users going through a multi-factor authentication process) management of the authentication process. Other systems require that the website or server system host and provide the multi-factor authentication request.

Further, automated computer programs can be devised to access websites to perform certain activities (e.g., to post messages to message boards), often leading to undesirable results (e.g., denial of service attacks). Websites often utilize a challenge-response user test (e.g., often called a Turing test) that is designed to determine whether the user is a human, in order to prevent computer controlled Internet-bots from utilizing the site. Previous and current solutions include a CAPTCHA test (commonly referring to a Completely Automated Public Turing test to tell Computers and Humans Apart), which involves a distorted image of a text string that a user deciphers and enters as a response to the test. However, many users find these tests difficult to decipher, sophisticated programs have been devised to bypass these tests, and some fraudsters hire individuals to decipher the tests. Other solutions often involve a second piece of hardware, such as a keycard or code generator, where a user attaches the device or swipes the card to authenticate. However, these solutions require a user carry (and possibly lose) additional hardware and they can typically lead to higher costs for the server operators.

Techniques and systems are provided herein for providing remote computer user authentication for a host server using a mobile device. In one embodiment a user authentication service can provide a domain reference and integration code for an API to a host server (e.g., a website) wishing use the service, so that the host server may begin utilizing the service. In this embodiment, for example, when a user attempts a login to the host server, the user authentication service can be activated and a user interface (UI) can be provided on a browser page of the host server to facilitate in the authentication process. Further, in this embodiment, the user authentication service can provide an authentication-test message (e.g., containing an authentication key), for example, in the UI on the browser page.

In this example, the user authentication service can send an authentication-request message (e.g., a SMS-based text message) to a mobile device designated by the user (e.g., during a user registration process on a website), and the user can respond with information (e.g., the authentication key) from the authentication-test message. In this embodiment, the user authentication service can authenticate the response from the user, for example, by matching the mobile device with the authentication key to user information in a database. The host server can be notified of the user's authentication after an appropriate response is received by the user authentication service. The host server, for example, may then allow the user to access secure areas of the server. In this way, in this example, a host server may be able to utilize the user authentication service without having to install large programs, proprietary systems, or have a pre-existing security relationship with the service.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
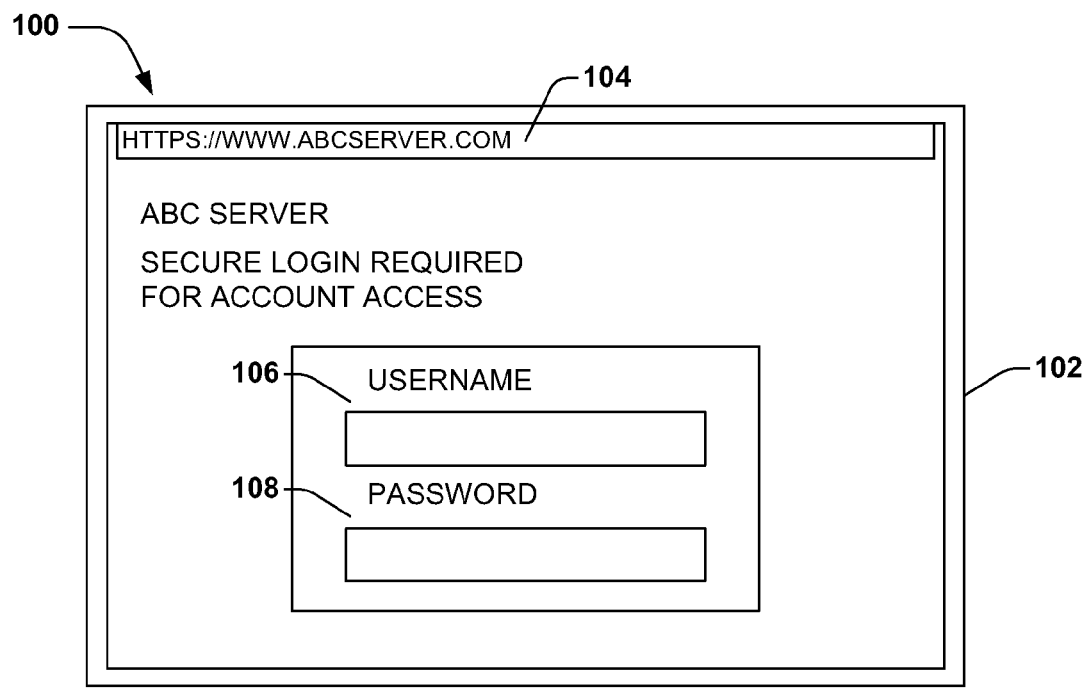
FIG. 1 is a block diagram illustrating an exemplary embodiment of a one factor authentication.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is an illustration of an exemplary embodiment 100 of a one factor authentication. In this embodiment 100, for example, an Internet user may use a browser 102 to log into a website 104 that comprises personal user information. In this example, the website 104 can request that the user supply a registered username 106, and a password 108 associated with the registered username 106. Typically, users will undertake a registration process whereby the user supplies a username and an associated password for logging into a site. In this example, using a password 108 associated with the username 106 is a one-factor authentication (e.g., one factor being the password associated with the username).

Figure 2:
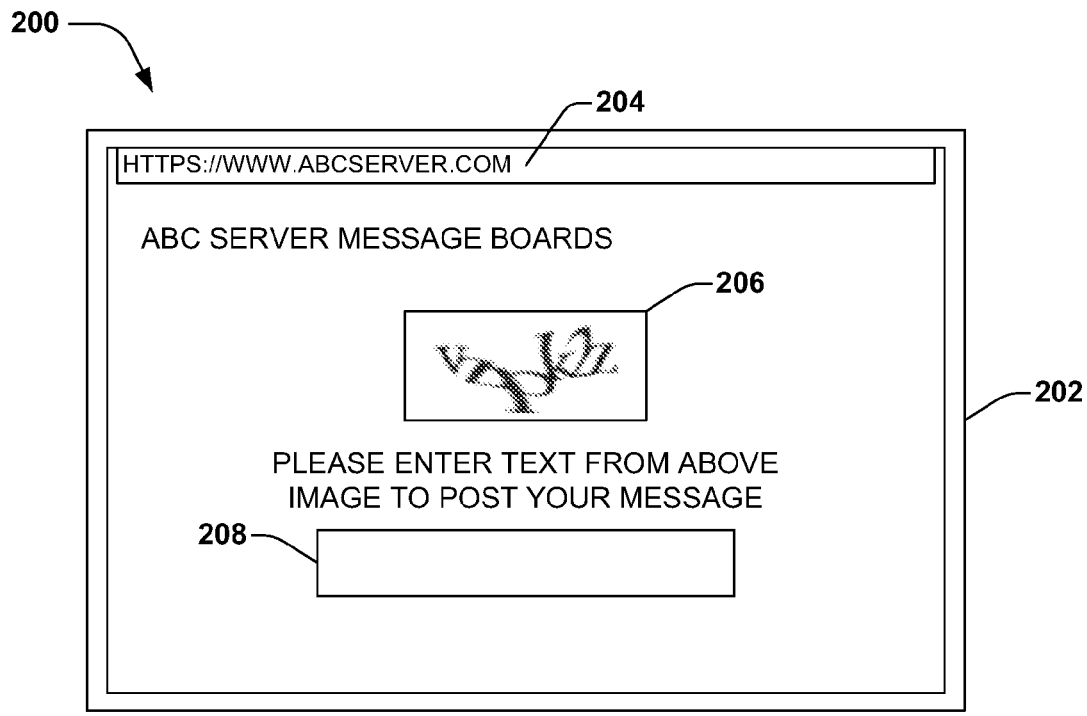
FIG. 2 is a block diagram illustrating an exemplary embodiment of a challenge response test.

FIG. 2 is an illustration of an exemplary embodiment 200 of a challenge response test. As an example, a challenge-response test can ask a user to input an appropriate response to a challenge posed by a website. In the exemplary embodiment 200, a user has point a browser 202 to a website 204 that is posing a challenge-response test. For example, if a user may wishes to post a message to a website's message boards, the website may wish to verify that the user is human and not an automated Internet bot designed to spam website message boards (e.g., post advertisements on the message boards). In this embodiment 200, the website 204 displays an image 206 of distorted letters and numbers (e.g., a CAPTCHA image), and asks the user to input the text from the image 206 in a response box 208. In this example, while a human user may be able to decipher the text in the image 206, a computer may not be able to effectively determine the text.

A method may be devised for providing a remote computer user authentication service. Such a service, for example, could be used for multi-factor user authentication, and/or for helping determine whether a user is a human.

Figure 3:
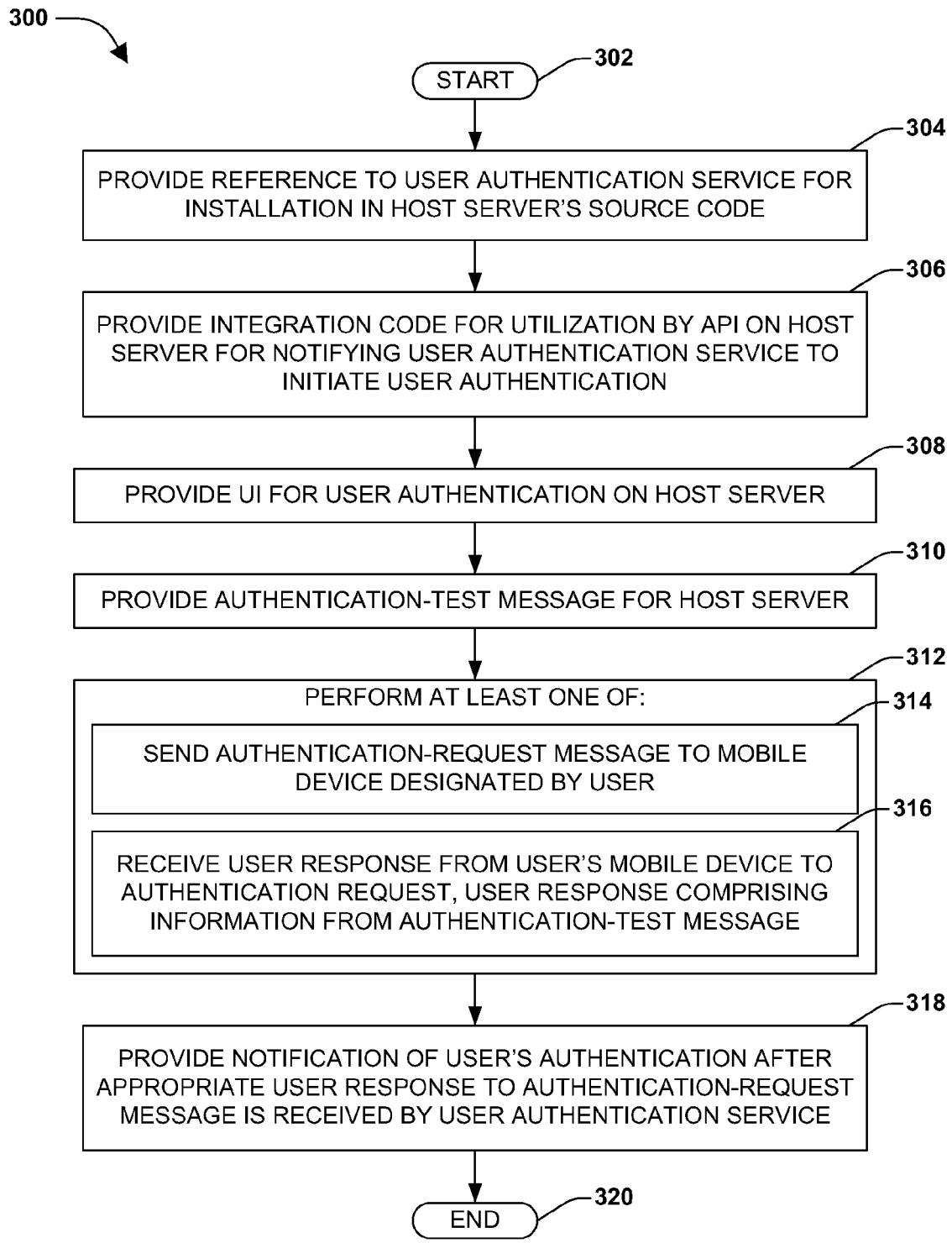
FIG. 3 is a flow chart illustrating an exemplary method of providing a multi-factor authentication service.

FIG. 3 is a flow chart illustrating an exemplary method 300 of providing a multi-factor authentication service. The exemplary method 300 begins at 302 and involves providing a reference to a user authentication service for installation in a host server's source code, at 304. As an example, in one embodiment, a website may allow the user authentication service to access and control an authentication webpage in the website by installing the user authentication service domain in the webpage's source code. In this embodiment, allowing the user authentication service to access and control the authentication webpage can allow the service to provide user authentication for the host website, for example, mitigating a need for the website to install and manage additional authentication software.

In the exemplary method 300, at 306, integration code can be provided for utilization by an application programming interface (API) on a host server, for notifying the user authentication service to initiate user authentication. In one embodiment, when a user logs on to the host server, for example, by inputting a username and password, an API on the host server can allow the host server to automatically notify the user authentication service that additional authentication (e.g., a second factor) may be needed. In this example, integration code from the user authentication service can be used to develop an appropriate API for this purpose.

At 308, in the exemplary method 300, a user interface (UI) can be provided for user authentication on the host server. In one embodiment, the user authentication service may provide a UI to the host server, for example, on a browser webpage, upon user authentication request. In this example, if the user authentication service has access and control of a user authentication webpage for the host server, the user authentication service can run the UI on the webpage automatically upon authentication request.

At 310, an authentication-test message is provided for the host server. As an example, a test message may be provided by the user authentication service that asks a user for a specific response in order to authenticate the user for the host server. In one embodiment, authentication test messages may be randomly generated by the user authentication service and displayed on a host website's webpage, for example. In this way, in this example, the authentication-test message can be different to for different user sessions. In this embodiment, the displayed message may ask a user to respond with information contained in the authentication-test message, for example, providing an authentication key found in the message.

At 312, the exemplary method 300 can comprise at least one of: sending an authentication-request message to a mobile device designated by the user; and receiving a user response from the user's mobile device to an authentication request, the user response comprising information from the authentication-test message. In one embodiment, upon detecting a request for user authentication from the host server, the user authentication service can send an authentication-request message to the user's mobile device (e.g., a mobile phone registered with a host website by the user during user registration). As an example, the authentication-request message may comprise a message requesting that the user responds to the message using the mobile device, and that the response comprise information (e.g., an authentication key) from an authentication-test message.

In another embodiment, the authentication-request message may comprise the authentication-test message. For example, the user authentication service may send a message with an authentication key to the user's mobile device, and the message may also request that the user enter the authentication key into the host server (e.g., through a user interface on a browser accessing the host server). In this way, for example, a response received from the user can include a second authentication factor, by way of the authentication key from the authentication-test message.

In another embodiment, no authentication-request message may be sent to the user's mobile device, for example. Instead, in this example, the user authentication service may provide a request in a display (e.g., a UI in a webpage of a host website) that the user send a response to the user authentication service using their designated mobile device. Further, in this example, the user's response from their designated mobile device can comprise information from the message displayed.

In the exemplary method 300, at 318, user authentication notification can be provided, after an appropriate user response to the authentication-request message is received by the user authentication service. In one embodiment, the user authentication service can determine whether a response received from the user met requirements set forth by the authentication-request message, or if a response was received at all. As an example, if a user responds to a message using their mobile device, and the response contains an authentication key requested by the service, the authentication service can notify the host server that the user has been authenticated.

In another embodiment, for example, the user authentication service may display an authentication notification on a display (e.g., a browser comprising the host server's webpage), which requests that the user activate an event on the display. In this example, the user may be asked to select a button on the display, which sends a notification to the host server that the user has be authenticated.

It will be appreciated that, while some examples of user, host server and user authentication service interaction have been provided above, the techniques described herein are not limited to these examples. The examples describe an exemplary method for providing a user authentication service, and those skilled in the art may devise techniques and systems for user, host server and user authentication service interaction that are not described.

In one aspect, the user authentication service can communicate with a user's designated mobile device as a means of authentication. In this aspect, utilizing the user's mobile device can, for example, be used as a second authentication factor by a host server (e.g., a website) for allowing access. As another example, the mobile device can be used to authenticate whether a user is a human. In one embodiment, communicating with the user's mobile device can comprise using short message service (SMS) communications (SMS is often referred to as text messaging).

In another aspect, providing a user authentication service can comprise "light-weight" provisioning for a host server. In this aspect, as an example, if a host website wishes to utilize multi-factor user authentication, a user authentication service can provide a reference to their domain, along with some light-weight integration code to be utilized by the host website in APIs. In this example, once the reference and integration code has been installed, user authentication can be utilized by the website. Further, in this aspect, the user authentication service can provide remaining elements of the user authentication remotely, for example, with the host website needing to do little else. In this example, the host website can create a cross-domain inline frame (Iframe), which is controlled by the user authentication service. In this way, the user authentication service can provide notifications, messages, and codes to a website user using the Iframe, for example.

Figure 4:
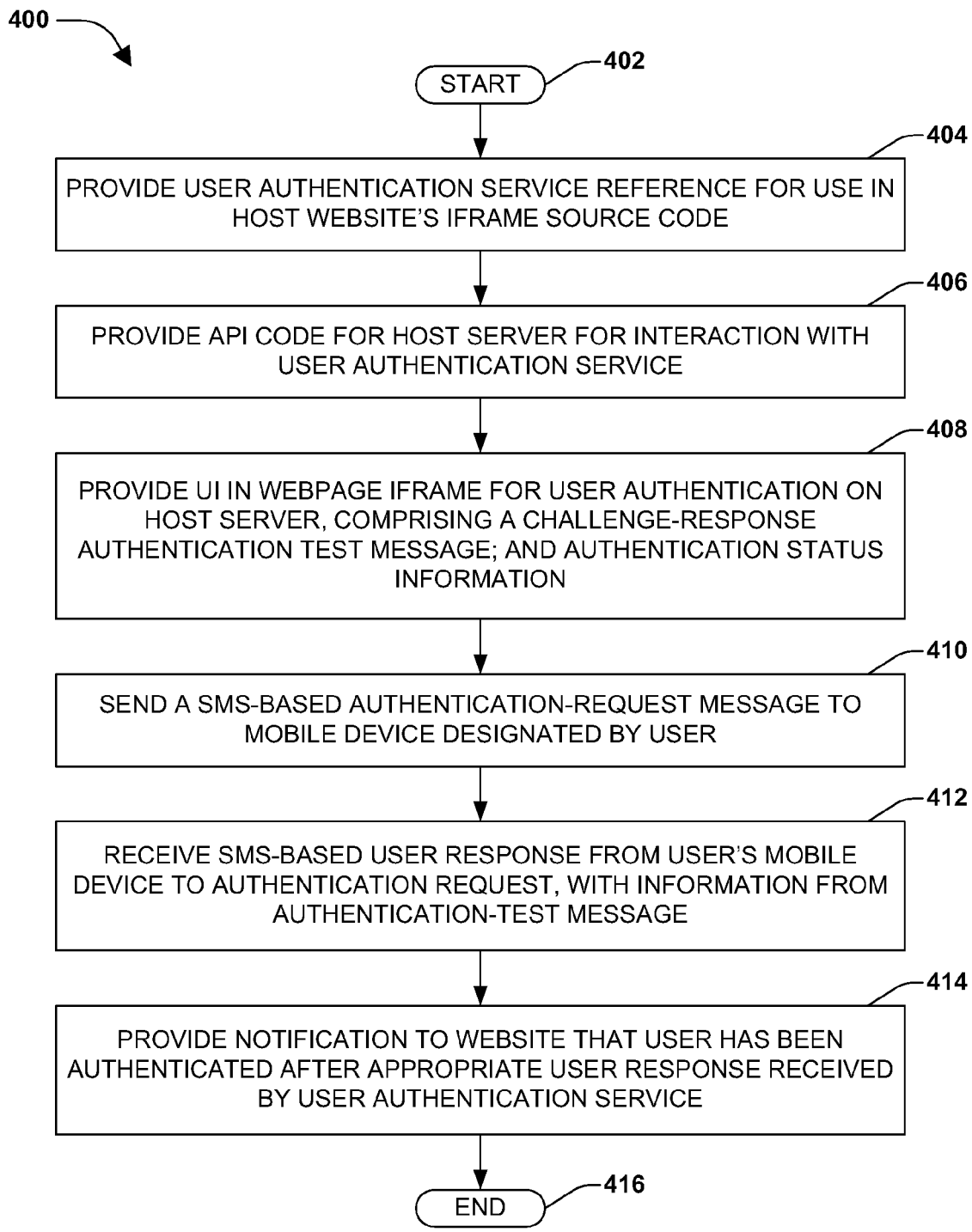
FIG. 4 is a flow chart illustrating an exemplary embodiment of a method for providing a multi-factor authentication service.

FIG. 4 is a flow chart diagram of an exemplary embodiment of 400 of the method 300, described above. The exemplary embodiment 400 begins at 402 and involves providing a user authentication service reference for use in a host website's inline frame (Iframe) source code. As an example, a host website can create an Iframe in a webpage, which allows cross-domain control, for example. In this example, by inserting a reference to the user authentication service's domain in the source code for the Iframe, the user authentication service can be granted control of the cross-domain Iframe.

At 406, or the exemplary embodiment 400, application programming interface (API) code is provided for the host server for interaction with the user authentication service. As an example, when a user logs into the website, the user authentication service can be notified to begin user authentication. Further, the user authentication service may notify the website that a user has been authenticated.

At 408, a user interface (UI) is provided in the Iframe in the webpage, for user authentication on the host server, the UI comprising a challenge-response authentication test message, and authentication status information. For example, because the user authentication service can control content in a cross-domain Iframe, the service may initiate a UI in the Iframe on a webpage that a user is accessing. In this example, the UI can display a CAPTCHA image, along with a message informing the user what they can do to complete authentication.

At 410, a SMS-based authentication-request message is sent to the user's designated mobile device. For example, when a user registers with the website, they can register a mobile device for use during authentication. In this example, the user authentication service can transmit a SMS message to the user's device, which instructs the user to reply with an appropriate authentication response.

At 412, a SMS-based user response to the authentication request is received from the user's mobile device, comprising information from the authentication test message. As an example, the user can send a response to the text message received on their mobile device, using a text message, to the user authentication service. In this example, in order to complete authentication, the response can contain a code from the CAPTCHA image displayed on the webpage.

At 414, user authentication notification is provided to the website, after an appropriate response has been received from the user's mobile device. As an example, if a user sends a response to the authentication service from their designated mobile device, and that response contains an appropriate key code as displayed in the UI on the website, the user authentication service can complete the user authentication. In this example, the service can then notify the host website that the user has been authenticated.

Figure 6:
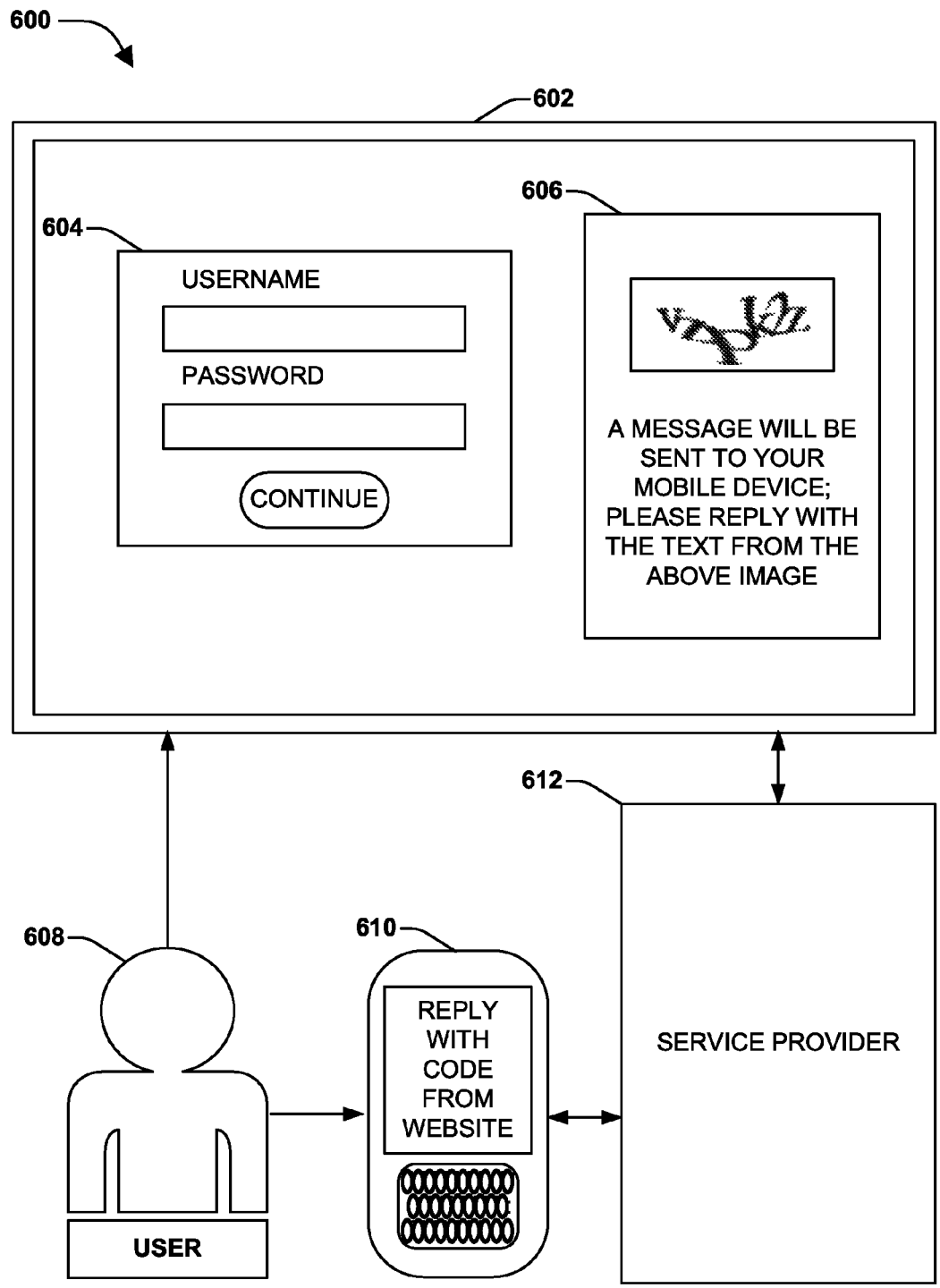
FIG. 6 is a component block diagram illustrating an exemplary embodiment of providing a multi-factor authentication service.

FIG. 6 is an illustration of an example multi-factor user authentication 600. In this example, a browser page 602 comprises a first authentication factor 604 in the form of a user log in, using a username and password. When a user 608 initiates authentication by entering their username and password into the login box 604, the user authentication service 612 can, for example, automatically detect a user authentication using the API code, and initiate a user interface 606 (UI) in a cross-domain Iframe on the browser page 602. In this example, the UI can contain an image of distorted text (e.g., a CAPTCHA image), and a status message telling the user that a message will be sent to their mobile device 610, along with instructions on how to proceed.

In the example authentication 600, in order to proceed with the user authentication, a user 608 will receive the message from the service 612 on their mobile device 610. In this example, the message may comprise a SMS-based text message, and can include instructions on how to complete authentication. The user 608 can send a reply to the service 612, which includes the text code from the distorted text image in the UI 606 on the browser page 602. The service 612, having received an appropriate response to the authentication message, can notify the host server that the user 608 has been authenticated.

In one embodiment, users may wish to access a website that comprises personal information about from the user (e.g., a website for accessing an individual's medical records from a clinic). In this embodiment, the website may ask a user to log in using a pre-registered username and password, which can be used by a user authentication service to identify authentication information on the user from a database. However, if a user is attempting to access the authentication service for a first time, for example, certain registration information may be needed by the authentication service in order to process user authentication. As an example, a user may need to register a mobile device that can be used by the authentication service for sending authentication messages.

Figure 5:
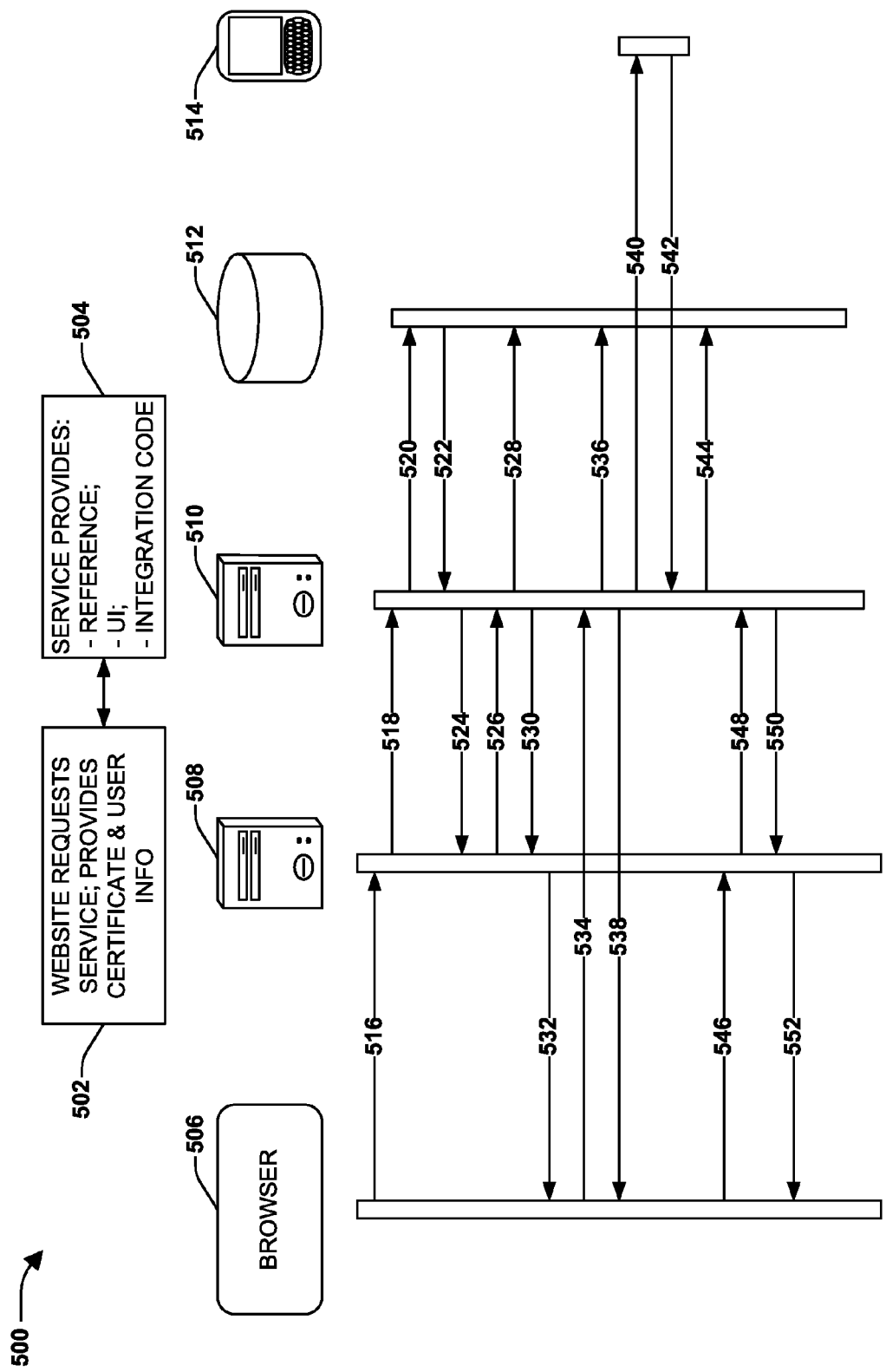
FIG. 5 is a flow diagram of an exemplary embodiment of providing a multi-factor authentication service.

FIG. 5 flow diagram of another exemplary embodiment 500 of a user authentication. This exemplary embodiment 500 illustrates information flow between elements in example elements of a user authentication, including, a browser page 506 (e.g., a webpage accessed by a user to log onto a secure site); a host server 508 (e.g., a website host server); a user authentication service 510; a user authentication service database 512; and a user's designated mobile device 514.

In this embodiment 500, at 502, a website can initiate the service by sending a request and providing a security certificate, along with registered user information. At 504, the service provides their domain reference, a user interface (e.g., in an Iframe), and integration code to the website. At 516, a user logs into the host website. At 518, the website validates the primary user login and request service authentication. At 520, the service authenticates the website as the sender and looks for established user information. At 522, if this is the user's first time logging in, the user information will not be in the database. At 524, the service returns "user not found" to the website. At 526, the website asks for a new service authentication. At 528, the service creates a new session user and stores the information in the database. At 530, the service returns that a new user has been created, and a CAPTCHA URL (e.g., comprising a CAPTCHA image).

At this point, in this example, a new user has been added to the service's database 512, and when that user logs onto the website the authentication information will be available. At 532, the website displays login request information. At 534, the CAPTCHA URL is request from the service. At 536, the service updates the login session information. At 538, a CAPTCHA image is returned to the browser for display. At 540, an SMS-based message is sent to the user's designated mobile device, with instructions on how to complete authentication. At 542, a SMS response is returned to the service with an appropriate response code from the CAPTCHA image. At 544, the session is updated in the database. At 546, user initiates an event in the browser, per the instructions. At 548, the website validates the primary login and requests service authentication. At 550, the service responds that the user has been authenticated. At 552, the website logs user into secure website location.

It will be appreciated, that the techniques and systems described herein are not limited to be used for accessing websites. In one embodiment, providing user authentication can be utilized for accessing a secure server or storage system remotely, for example. In this example, an enterprise system may wish to utilize multi-factor authentication to allow a remote user access to the system.

In another aspect, a user of the authentication service may designate a mobile device, such as a mobile telephone, for a second-level of authentication where the device may be shared with people other than the user. In one embodiment, even though the user may share a mobile device with others, the user may not wish that the others authenticate the user's identification, for example, using the mobile device. As an example, a parent may share their mobile telephone with their children; however, the parent may not wish for the children to attempt to authenticate transactions for the parent using the parent's mobile device.

In this aspect, the authentication service may provide an ability for the user to utilize a secret code when utilizing a designated mobile device to authenticate transactions, where the designated mobile device may at times be utilized by persons that are not the user (e.g., children of the user). In this embodiment, for example, the user can select a personal identification number (PIN) that is known only by the authentication service and the user (e.g., the parent). Further, in this example, when the user attempts to authenticate a transaction using their mobile device, the user can enter the shared secret PIN into a reply to the authentication service. In another embodiment, after a user replies to an authentication request using their designated mobile device, for example, the authentication service can prompt the user to enter the shared secret code. It will be appreciated that those skilled in the art may devise alternate ways to utilize a secret code in combination with providing a multi-factor authentication service. The techniques and systems described herein are not limited to those embodiments described above.

Figure 7:
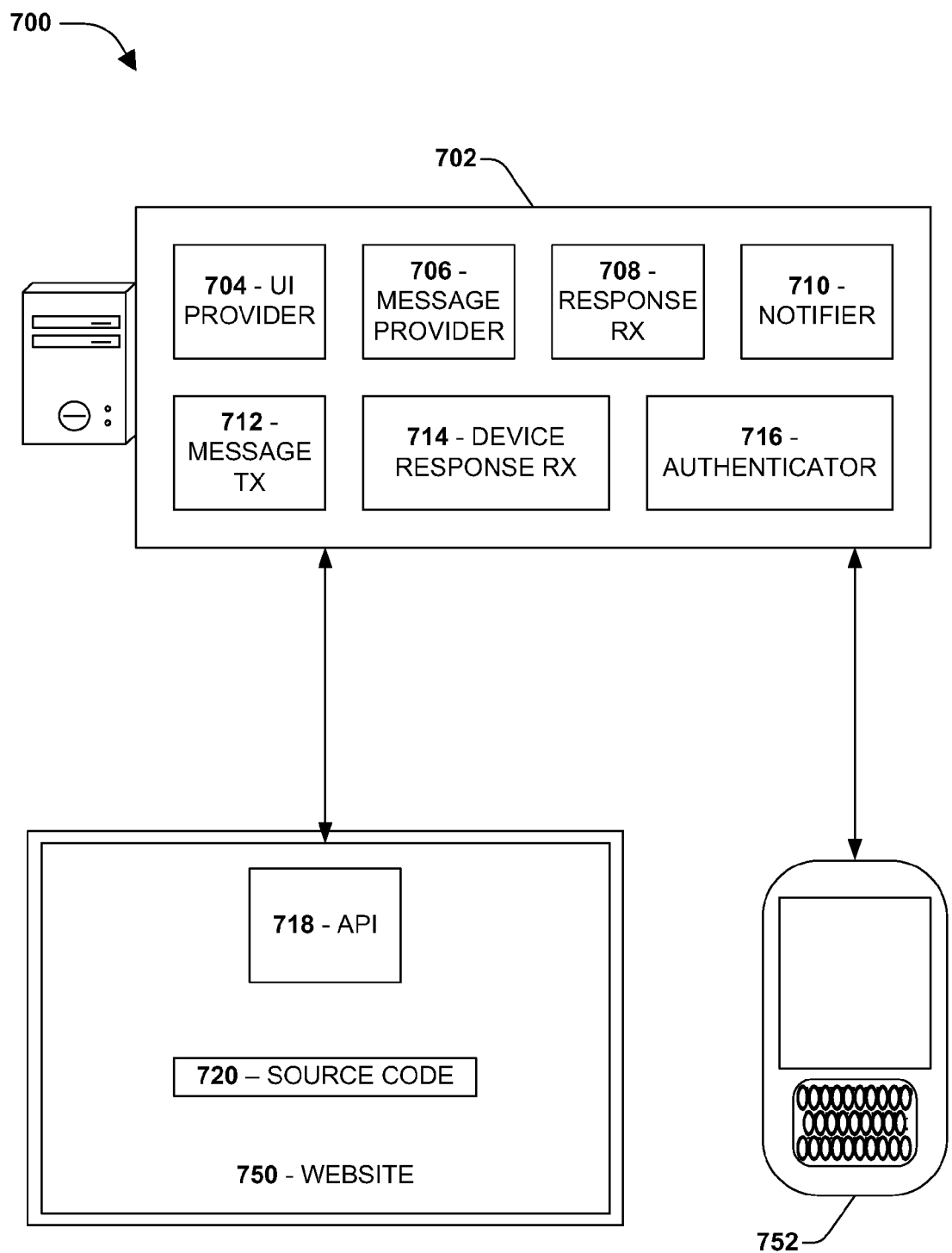
FIG. 7 is a component block diagram illustrating an exemplary system for providing a multi-factor authentication service.

A system may be devised for providing remote Internet user authentication service. FIG. 7 is a component block diagram illustrating an exemplary system 700 for providing a multi-factor authentication service. The exemplary system 700 comprises a user authentication service 702, for providing remote user authentication to a host server. The user authentication service 702 comprises a user interface (UI) provider 704, which may be configured to provide a user authentication UI on a host website 750. As an example, the UI provider can display and operate a UI in a cross-domain Iframe on host website's webpage.

Further, the user authentication service 702 comprises an authentication-test message provider 706, which may be configured to provide an authentication-test message. For example, the authentication-test message provider 706 may provide the authentication-test message inside the UI on the webpage viewed by a user. In this way, in this example, the user may be able to use information from the authentication-test message to complete user authentication.

Additionally, the user authentication service 702 comprises an authentication-test message response receiver 708, which can be configured to receive a response to the authentication-test message. As an example, a user viewing an authentication-test message in the UI on the webpage may be instructed to input an authentication key that was sent to a user's mobile device 752. In this example, the authentication-test message response receiver 708 can receive the authentication key input by the user.

The user authentication service 702 further comprises a message transmitter 712, which can be configured to transmit an authentication-request message to a user's designated mobile device 752. For example, the authentication service 702 may wish to attempt user authentication by sending a SMS-based message to a mobile device 752 that was designated by the user during registration with the website 750. In this way, in this example, the authentication-request message can contain information for completing user authentication, thereby utilizing the user's mobile device 752 as a second authentication factor.

The user authentication service 702 further comprises a mobile device response receiver 714, which can be configured to receive a response to an authentication request from the user's designated mobile device 752. As an example, a user receiving an authentication-request message, may be instructed to send a message to the authentication service 702 containing certain text, from the user's mobile device 752. In this example, the mobile device response receiver 714 can receive the message sent from the user's mobile device 752.

The user authentication service 702 further comprises an authenticator 716, which can be configured to authenticate a user's response to the authentication request; and an authentication notifier 710, which can be configured to provide for notification of user authentication to the host website. As an example, a user response may need to be from a designated mobile device 752, and may comprise an authentication key that was displayed in the UI. In this example, once the user responds to an authentication request, the authenticator 716 can determine whether the response meets requirements for authentication. Further, once the authentication service 702 has authenticated the user, the host website 750 can be notified of the authentication. As an example, instruction in the UI may instruct a user to refresh the webpage, once authentication is completed. In this example, upon refreshing the webpage, the website may request user authentication and the authentication notifier 710 in the service 702 can notify the website that the user has been authenticated.

The exemplary system 700, in FIG. 7, further comprises source code 720 in the host website 750, which can comprise a reference to the user authentication service 702. As an example, if a reference to the user authentication service's domain is inserted into the host webpage's source code for an Iframe (e.g., a cross-domain Iframe referencing the user authentication service's domain) the user authentication service 702 may be able to control content inside the Iframe. In this way, in this example, the user authentication service 702 can use the UI in the Iframe on the host website 750.

The exemplary system 700 further comprises an application programming interface 718 (API) on the host website 750 configured to facilitate interaction between the host website 750 and the user authentication service 702. As an example, when a user logs onto the website, the API 718 can facilitate automatic notification to the user authentication service 702 to initiate authentication. Further, in this example, the API 718 may facilitate notifying the website 750 that user authentication is complete.

Figure 8:
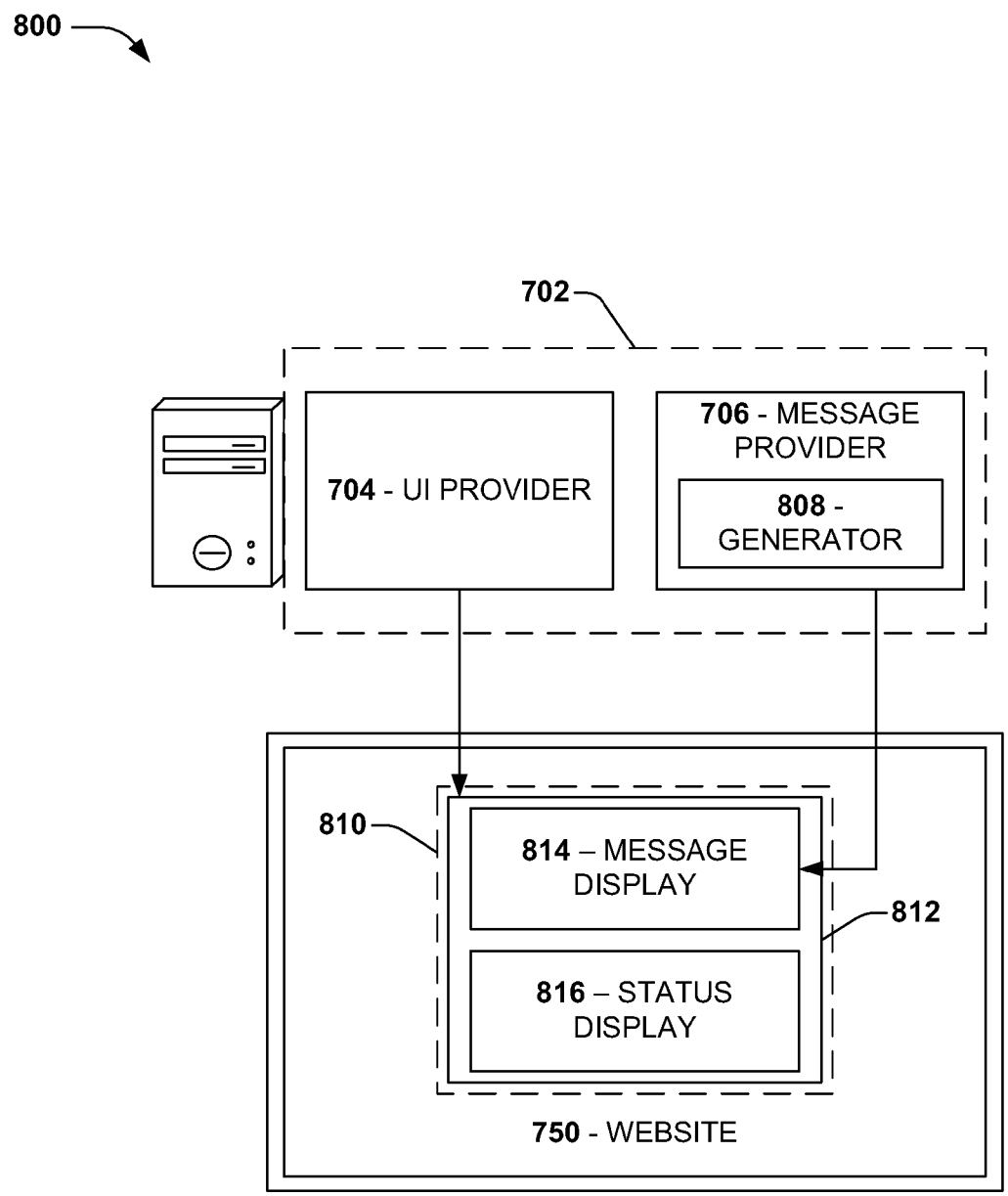
FIG. 8 is a component block diagram illustrating a portion of an exemplary embodiment of a system for providing a multi-factor authentication service.

FIG. 8 a component block diagram illustrating a portion of an exemplary embodiment of a system 800 for providing a multi-factor authentication service. In this embodiment, the user interface 812 (UI), generated by the UI provider 704 in the authentication service 702, can comprise an authentication-test message display component 814, which may be configured to display an authentication-test message from the authentication-test message provider. As an example, the host website 750 can comprise a cross-domain Iframe 810, which the user authentication service 702 can use for the UI 812. In this example, the UI can display a CAPTCHA image as an authentication-test message, which will be utilized by the user for authentication.

In this embodiment 800, the user interface 812 (UI) further comprises a status display component 816, which can be configured to display authentication status messages. As an example, the status display component 816 may display instructions to a user for completing user authentication. In this example, information may be displayed informing the user that a SMS message has been sent to their designated mobile device.

Additionally, in this embodiment 800, the authentication-test message provider 706 comprises an authentication-test generator 808 configured to generate random authentication tests. As an example, the authentication-test generator 808 may generate random authentication keys to be displayed in the authentication-test message display component 814 of the UI 812. In this way, in this example, respective authentication keys can be specific to a user's authentication session, and may be used to authenticate the user.

In one embodiment, the user authentication user interface could comprise an authentication complete component. The authentication complete component may be configured to provide a request in a UI that the user activate an event to notify a host website a user has been authenticated. As an example, after a user authentication service has authenticated the user of a host server, a message can be displayed in the UI instructing the user to refresh a browser's page (e.g., a webpage). In this way, in this example, upon refreshing the page the host server can request authentication from the user authentication service, and the user authentication service can notify the host server that the user has been authenticated.

Figure 9:
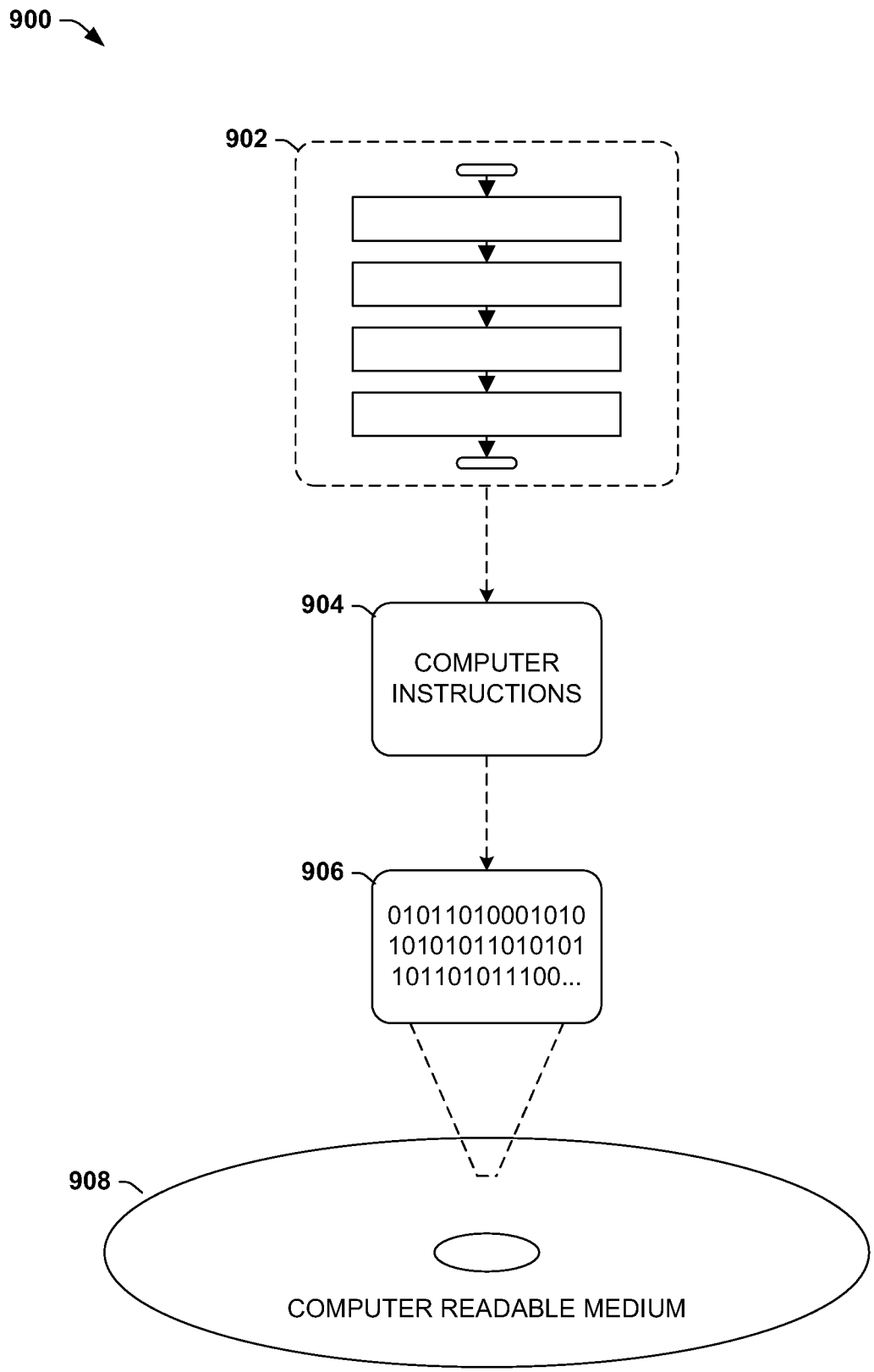
FIG. 9 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to one or more of the principles set forth herein. In one such embodiment 900, the processor-executable instructions 904 may be configured to perform a method 902, such as the exemplary method 300 of FIG. 3, for example. In another such embodiment, the processor-executable instructions 904 may be configured to implement a system, such as the exemplary system 700 of FIG. 7, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
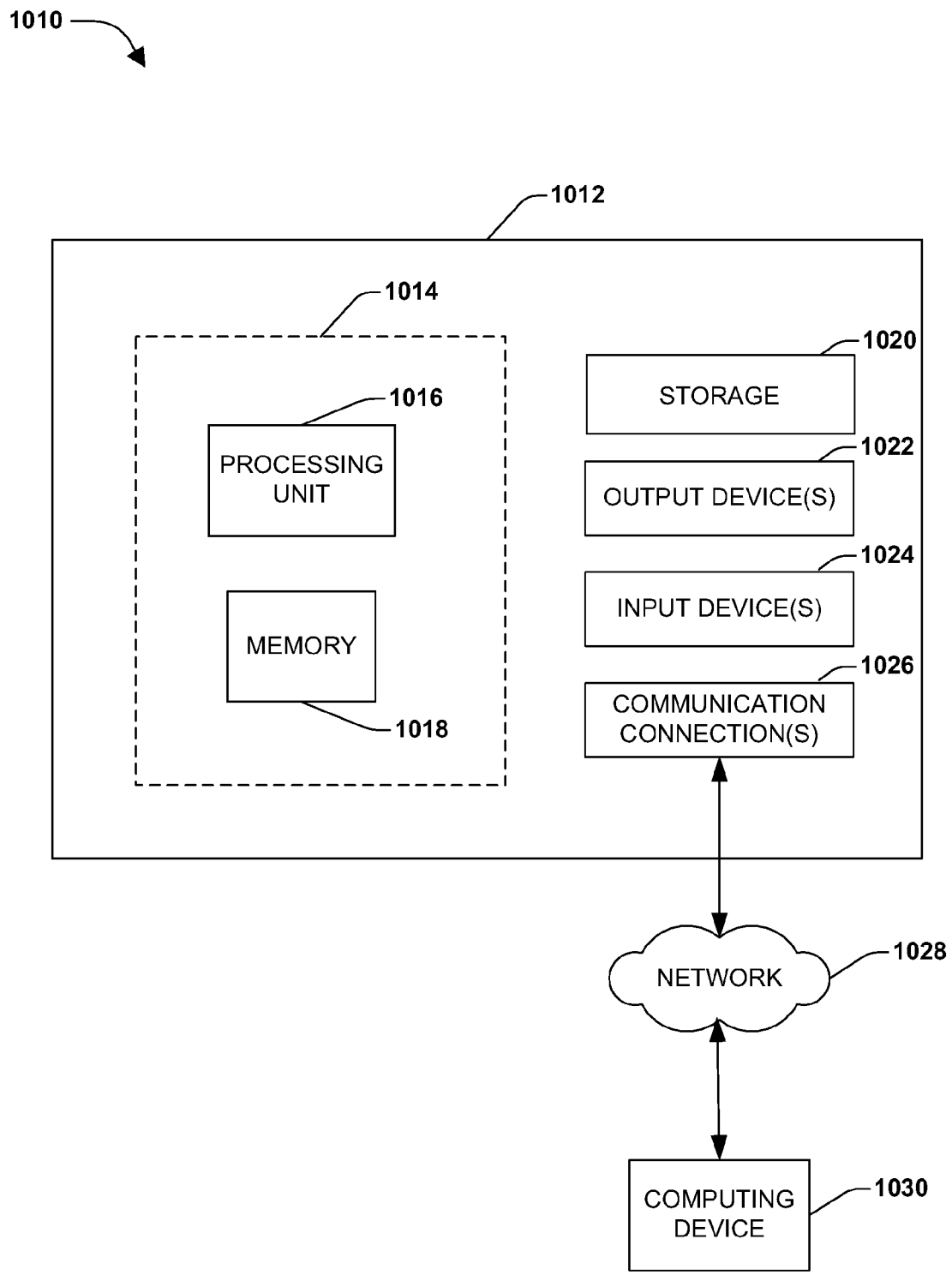
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A tangible computer readable storage medium comprising instructions that when executed perform a method, comprising:
   providing a reference to a user authentication service for installation in source code of a host server, the reference associated with source code for an Iframe in a browser accessing the host server;
   providing a user interface (UI) in the Iframe for user authentication on the host server;
   providing integration code to the host server for use in an application programming interface for notifying the user authentication service to initiate user authentication upon a request from the UI;
   providing an authentication-test message for display in the UI, the authentication-test message comprising a randomly generated challenge-response test specific to a user session in the host server;
   performing at least one of:
      sending a short message service (SMS)-based authentication-request message, requesting a response, to a mobile device designated by a user; or
      receiving an SMS-based user response from the mobile device, the SMS-based user response comprising an authentication key from the authentication-test message; and
   providing a notification to the host server of an authentication of the user after at least one of a desired user response to the SMS-based authentication-request message or the SMS-based user response is received by the user authentication service, at least one of the desired user response or the SMS-based user response comprising an activation of an event by the user which results in the notification, to the host server, of the authentication of the user.

2. The tangible computer readable storage medium of claim 1, the reference associated with a domain.

3. The tangible computer readable storage medium of claim 2, the domain associated with the user authentication service.

4. The tangible computer readable storage medium of claim 1, the host server configured to host a website.

5. The tangible computer readable storage medium of claim 4, the Iframe provided in the website.

6. The tangible computer readable storage medium of claim 1, the method comprising determining whether the user is human based upon at least one of the desired user response or the SMS-based user response.

7. The tangible computer readable storage medium of claim 4, the Iframe associated with a first domain, the first domain different than a second domain associated with the website.

8. A system, comprising:
   one or more processing units; and
   memory comprising instructions that when executed by at least some of the one or more processing units, perform a method comprising:
      providing a reference to a user authentication service for installation in source code of a host server, the reference associated with source code for an Iframe in a browser accessing the host server;
      providing a user interface (UI) in the Iframe for user authentication on the host server;
      providing integration code to the host server for use in an application programming interface for notifying the user authentication service to initiate user authentication upon a request from the UI;
      providing an authentication-test message for display in the UI, the authentication-test message comprising a randomly generated challenge-response test specific to a user session in the host server;
      performing at least one of:
         sending a short message service (SMS)-based authentication-request message, requesting a response, to a mobile device designated by a user; or
         receiving an SMS-based user response from the mobile device, the SMS-based user response comprising an authentication key from the authentication-test message; and
      providing a notification to the host server of an authentication of the user after at least one of a desired user response to the SMS-based authentication-request message or the SMS-based user response is received by the user authentication service, at least one of the desired user response or the SMS-based user response comprising an activation of an event.

9. The system of claim 8, the reference associated with a domain.

10. The system of claim 9, the domain associated with the user authentication service.

11. The system of claim 8, the host server configured to host a website.

12. The system of claim 11, the Iframe provided in the website.

13. The system of claim 8, the method comprising determining whether the user is human based upon at least one of the desired user response or the SMS-based user response.

14. The system of claim 11, the Iframe associated with a first domain, the first domain different than a second domain associated with the website.

15. A method, comprising:
- providing a reference to a user authentication service for installation in source code of a host server, the reference associated with source code for an Iframe in a browser accessing the host server;
- providing a user interface (UI) in the Iframe for user authentication on the host server;
- providing integration code to the host server for use in an application programming interface for notifying the user authentication service to initiate user authentication upon a request from the UI;
- providing an authentication-test message for display, the authentication-test message comprising a randomly generated challenge-response test specific to a user session in the host server;
- performing at least one of:
    - sending a short message service (SMS)-based authentication-request message, requesting a response, to a mobile device designated by a user; or
    - receiving an SMS-based user response from the mobile device, the SMS-based user response comprising an authentication key from the authentication-test message; and
- providing a notification to the host server of an authentication of the user after at least one of a desired user response to the SMS-based authentication-request message or the SMS-based user response is received by the user authentication service.

16. The method of claim 15, the reference associated with a domain.

17. The method of claim 16, the domain associated with the user authentication service.

18. The method of claim 15, the host server configured to host a website.

19. The method of claim 18, the Iframe provided in the website.

20. The method of claim 15, comprising determining whether the user is human based upon at least one of the desired user response or the SMS-based user response.

* * * * *